Oct. 6, 1959    R. F. TUTTLE    2,907,379
ROLLER TYPE TIRE MOUNTING MACHINE
Filed March 21, 1957    3 Sheets-Sheet 1
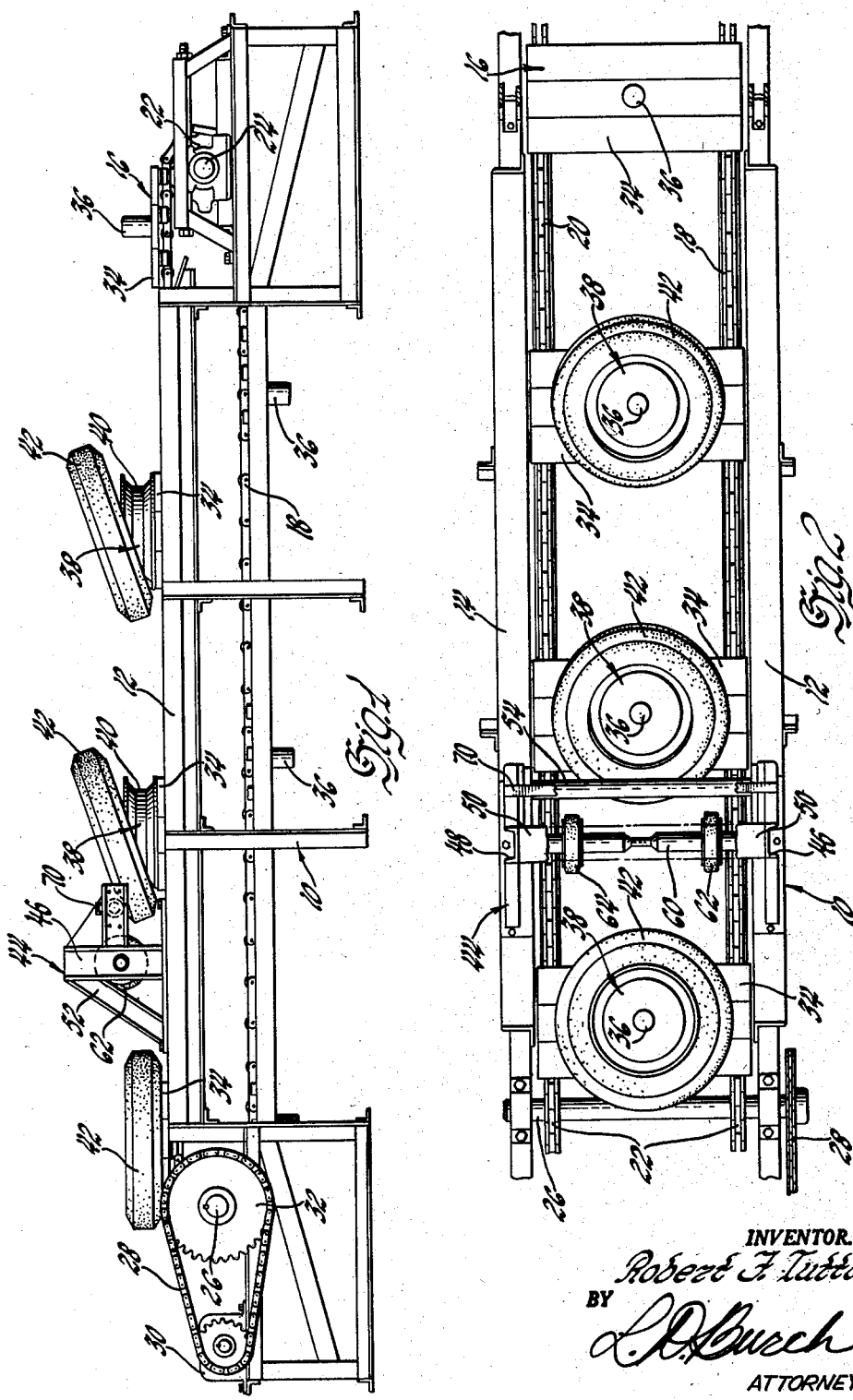
INVENTOR.
Robert F. Tuttle
BY
ATTORNEY Oct. 6, 1959 R. F. TUTTLE 2,907,379
ROLLER TYPE TIRE MOUNTING MACHINE
Filed March 21, 1957 3 Sheets-Sheet 3

INVENTOR.
Robert F. Tuttle
BY
ATTORNEY

United States Patent Office
2,907,379
Patented Oct. 6, 1959

2,907,379

ROLLER TYPE TIRE MOUNTING MACHINE

Robert F. Tuttle, Highland Park, Mich., assignor to General Motors Corporation, Detroit, Mich., a corporation of Delaware Application March 21, 1957, Serial No. 647,547

2 Claims. (Cl. 157—1.1)

This invention relates to tire mounting apparatus in general and more particularly to apparatus for assembling a vehicle road tire upon a wheel rim.

The increasing production requirements by manufacturers in mass producing automotive vehicles has caused a serious assembly problem in mounting vehicle tires to road wheels in time with production line requirements.

It is here proposed to provide apparatus for automatically assembling automotive vehicle tires upon tire supporting wheels rims. The proposed apparatus includes as few as two moving parts compared with some sixty moving parts which have been used on similar type machines. The proposed machine enables faster assembly of tires on road wheels and, because of its simplicity, requires much less maintenance than similar type machines which previously have been used.

The proposed machine includes an endless belt type conveyor line upon which wheel rims are received at spaced intervals. An operator places a tire upon each wheel rim with the beads of the tire in the direction of movement disposed between the wheel rims. This places the tire at approximately a 30° angle to the wheel upon which it is to be assembled. The conveyor moves the wheel and tire together through a fixture which includes a stationary cross bar and a pair of rubber wheels or rollers set parallel to the centerline of the conveyor and disposed to contact and depress the opposite side walls of the tire as it passes under the fixture. The rollers, which are the only moving parts of the fixture, serve both to depress the tire side walls and to squeeze and drag the leading beads of the tire into the drop center section of the wheel rim. With the tire beads disposed in the drop section area of the rim the remaining portion of the tire is easily spread over the back of the wheel rim by the cross bar disposed just above the upper level of the wheel rim.

The machine is fully automatic and may be disposed close to the production line so that it may be timed therewith. This eliminates any necessity for stocking assembled tires and rims since the machine may be operated at a speed commensurate with the speed of the rest of the production line. A further advantage is realized in that the over-all simplicity of the machine practically eliminates any maintenance problems.

In the drawings:

Figure 1 is a side view of a proposed tire mounting machine.

Figure 2 is a top view of all but the extreme end portions of the machine shown in Figure 1.

Figure 3:
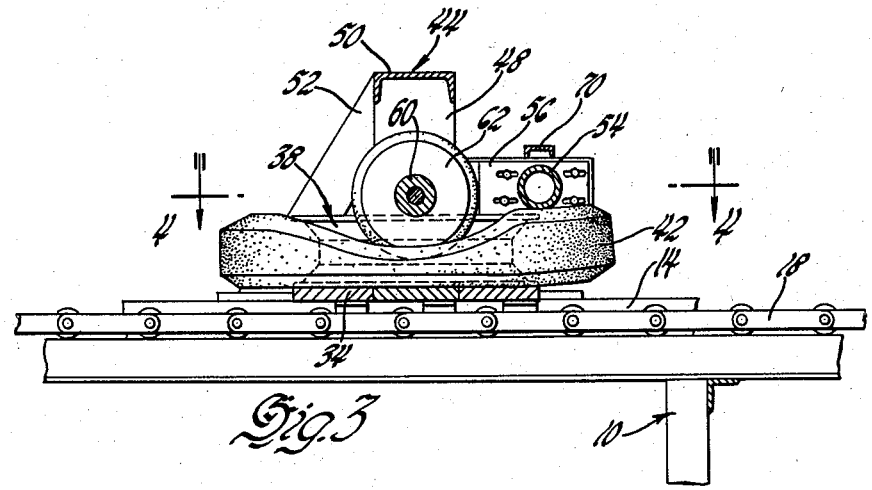
Figure 3 is a side view of a part of the proposed machine having one end of the mounting fixture removed and as seen in the plane of line 3—3 of Figure 4.

The tire mounting machine comprises a stand 10 including side rails 12 and 14 between which is disposed an endless chain belt conveyor 16. The conveyor includes chain link tracks 18 and 20 engaged by sprocket wheels 22 mounted on rotatable shafts 24 and 26 disposed at each end of the stand. The one shaft 26 is driven by a chain belt arrangement 28 connecting motor means 30 to a drive sprocket wheel 32 thereon. The conveyor includes table portions 34 formed by three plank members fixed and disposed between the chain link tracks. An upright post or spindle 36 is provided on one of the planks and is disposed to receive a wheel rim 38 thereover.

The wheel rim 38 is of the standardly known type including a dished face area with an opening therein for receiving the end of an axle shaft (and as regards the tire mounting machine, for receiving the upright post or spindle 36 therethrough). Between the rims of the wheel is the drop center area 40 within which the beads of a tire are normally disposed.

The machine which is herein described and shown is for mounting tubeless tires on wheel rims. Therefore, only the tire carcass 42 and wheel rims 38 are shown.

A vehicle tire 42 is placed upon the wheel rim 38 as it lies on the conveyor 16 with the beads thereof, in the direction of conveyor movement, disposed between the wheel rim flanges and within the drop center area 40 thereof. The tire will lie at an angle of about 30° as is shown in Figure 1.

The conveyor 16 moves the wheel rim 38 and tire 42 toward a tire mounting fixture 44 which is adapted to assemble the tire onto the wheel rim.

Figure 4:
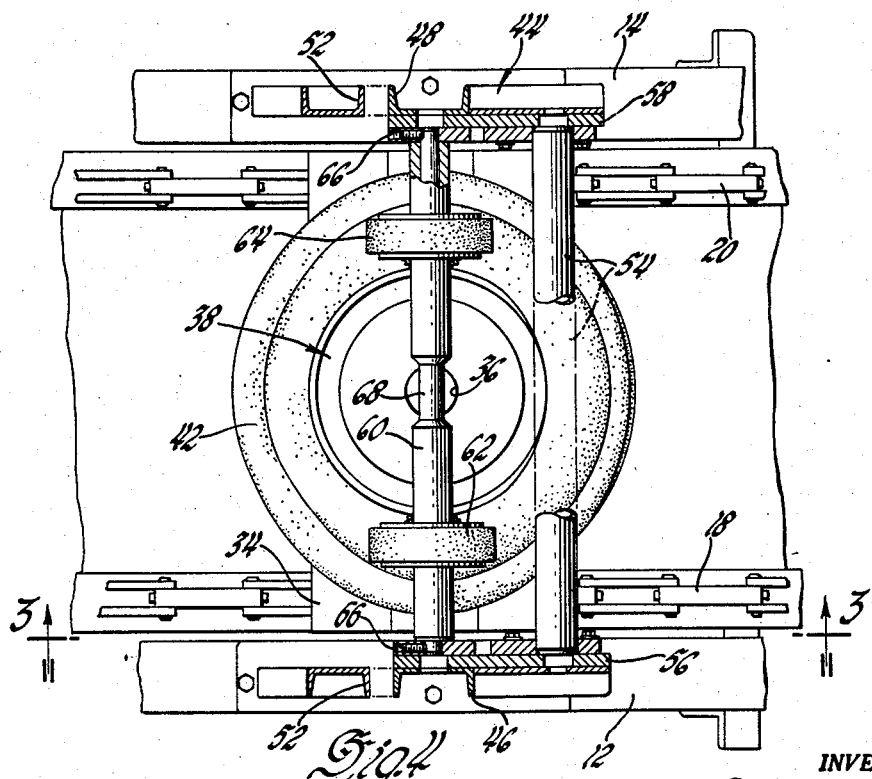
Figure 4 is an enlarged top view of the proposed machine having a part of the mounting fixture removed and as taken in the plane of line 4—4 of Figure 3.

The tire mounting fixture 44 includes upright supports 46 and 48 secured to the side rails 12 and 14 and joined together by a cross brace 50 and structurally braced by other members 52. A transverse bar 54 is supported in front of the upright supports by horizontal braces 56 and 58 secured to the supports. A shaft 60 is disposed between the upright supports and has rollers or wheels 62 and 64 mounted thereon which are rotatable on the shaft and which include a rubber wheel facing or the like. The shaft 60 is fixed against rotation as by set screw means 66 shown in Figure 4 and has the center portion thereof reduced in cross section as at 68 to enable the rim receiving post 36 to pass thereunder without obstruction.

As the wheel rim 38 and tire 42 are received within the mounting fixture 44, the bar 54, which is disposed at a height of about ⅛ inch above the upper face of the wheel rim, engages the tire and drags the beaded edges thereof within the drop center area 40 and the rest of the tire back over the wheel rim. The roller members 62 and 64 next engage the side walls of the tire 42 to depress the beaded portion of the tire wall further within the drop center area 40 and to stretch and drag the leading beads of the tire down into the drop center area of the rim as the transverse bar 54 drags or spreads the remaining portion of the tire, which is disposed above the upper level of the rim, over the back side of the wheel rim 38 and also into the drop center area.

Although the side wall depression and drag provided by the rollers 62 and 64 enables the bar 54 to spread or wipe the back portion of the tire over the rim with much less stretch of the tire beads than is normally incident to manual assembly of the tire carcass on a wheel rim, it has been found helpful to lubricate the beads of the tire prior to this assembly operation to further insure that the tire will slip easily over the rim and not be cut in the process.

Figure 5:
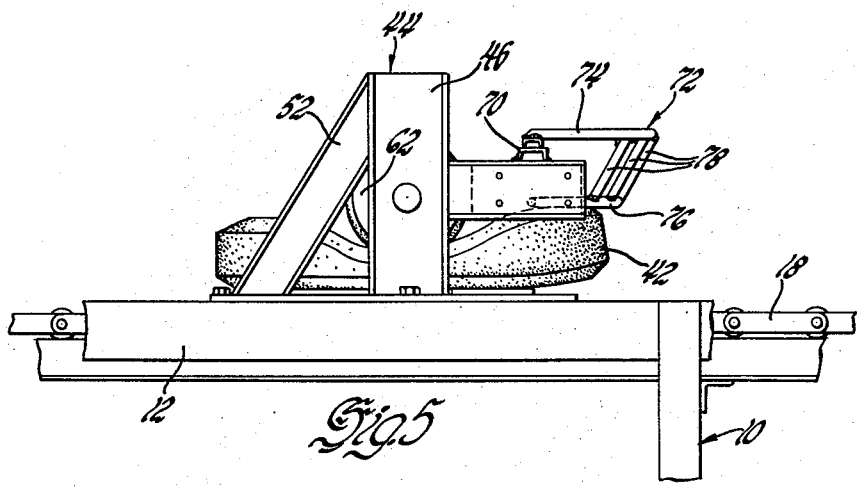
Figure 5 shows a modification of the tire mounting fixture.
Figure 6:
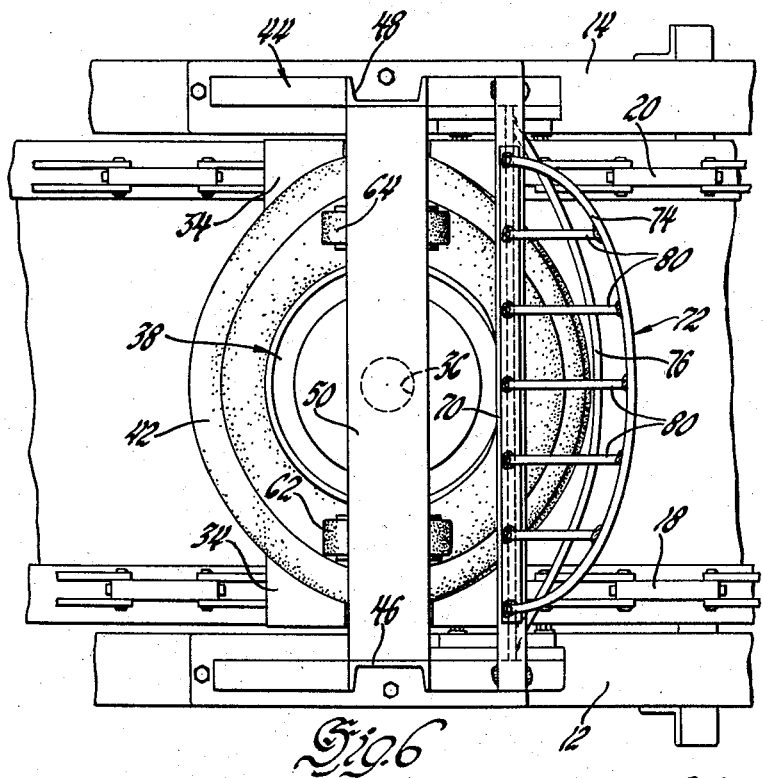
Figure 6 is a top view of the modified mounting fixture shown in Figure 5.

A further modification of the tire mounting fixture may include means, such as are shown in Figures 5 and 6, for engaging the tire rather than the transverse bar as has been previously described.

The forwardly disposed braces 56 and 58 extending from the upright supports 46 and 48 are secured together by a cross brace 70 as in the first described tire mounting fixture. However, in place of the transverse bar 54 supported between the braces a guide means or wiper 72 made up of bar stock is provided. The wiper 72 includes parallel spaced bars 74 and 76 bent to extend forwardly of the horizontal braces and having connecting bar stock pieces 78 secured therebetween and at a slightly inclined angle. The rails are also braced from the cross rail by short pieces of bar stock 80.

The wiper arrangement described, which is shown in Figures 5 and 6, serves substantially the same purpose as the transverse bar previously described and shown in the first four figures of the patent drawings. The latter arrangement is, however, an improvement in that the tire portion lying above the upper level of the rim is guided more than in the previous arrangement.

I claim:

1. A tire mounting fixture comprising a moving wheel rim support, a stationary bar disposed at a fixed height above said support to allow a horizontally positioned vehicle wheel rim to pass thereunder, a pair of roller wheels mounted upon said fixture and spaced apart from said bar and apart from each other a distance greater than the outer diameter of said wheel rim, and means for moving a vehicle wheel rim having a vehicle tire partially disposed thereon through said fixture, said bar wiping said tire lying above said wheel rim over the edge thereof and said rollers engaging the side walls of said tire to depress said tire and assist said bar in assembling said tire upon said rim.

2. A tire mounting fixture for use with a conveyor line receiving horizontally positioned vehicle wheel rims having vehicle tires partially mounted thereon and transferring said wheel rims and tires from one end thereof to the other, said fixture including a pair of rollers disposed on opposite sides of said conveyor and thereover and spaced apart a distance greater than the outer diameter of said wheel rim and engaging the side walls of said tires disposed upon said rims, and a stationary bar disposed forwardly of said rollers and over said conveyor a distance allowing said wheel rims to pass thereunder, said bar engaging said tire and wiping said tire over said rim for assembly thereon.

References Cited in the file of this patent

UNITED STATES PATENTS

| | | |
|---|---|---|
| 1,850,053 | Stevens | Mar. 15, 1932 |
| 2,665,747 | Harrison | Jan. 12, 1954 |